(12) United States Patent
Knopik et al.

(10) Patent No.: US 8,079,897 B2
(45) Date of Patent: *Dec. 20, 2011

(54) CARCASS INTERVENTION TRACKING AND METHODS

(75) Inventors: Garry P. Knopik, Wichita, KS (US); Brad Nagel, Wichita, KS (US); John Kramar, Schuyler, NE (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/849,462

(22) Filed: Aug. 3, 2010

(65) Prior Publication Data

US 2010/0317273 A1   Dec. 16, 2010

Related U.S. Application Data

(63) Continuation of application No. 12/290,952, filed on Nov. 5, 2008, now Pat. No. 7,837,539.

(60) Provisional application No. 60/985,374, filed on Nov. 5, 2007.

(51) Int. Cl.
*A22C 18/00* (2006.01)

(52) U.S. Cl. ............................................. 452/150
(58) Field of Classification Search ............... 452/52, 452/53, 149, 150, 198
See application file for complete search history.

(56) References Cited

U.S. PATENT DOCUMENTS

| | | | | |
|---|---|---|---|---|
| 5,980,377 | A  * | 11/1999 | Zwanikken et al. | 452/184 |
| 6,623,348 | B1 * | 9/2003 | O'Neill | 452/133 |
| 6,724,309 | B2 | 4/2004 | Grose et al. | |
| 6,859,672 | B2 * | 2/2005 | Roberts et al. | 700/89 |
| 6,878,052 | B2 * | 4/2005 | Andersson | 452/149 |
| 7,210,993 | B2 * | 5/2007 | Woods et al. | 452/149 |
| 7,316,202 | B2 * | 1/2008 | Fantin et al. | 119/174 |
| 2005/0181720 | A1 | 8/2005 | Osborn et al. | |

FOREIGN PATENT DOCUMENTS

WO   2005/103284   11/2005

* cited by examiner

*Primary Examiner* — Richard Price, Jr.

(57) ABSTRACT

The present invention provides systems and methods for tracking carcass intervention data accumulated during carcass processing. An identification is assigned to the carcass. The carcass is subjected to at least one intervention, during which processing data is accumulated. The carcass identification and the processing data are then associated and compared to predetermined processing parameters.

20 Claims, 6 Drawing Sheets

CARCASS INTERVENTION TRACKING AND METHODS

CROSS REFERENCE TO RELATED APPLICATION

This application is a continuation of U.S. application Ser. No. 12/290,952 filed Nov. 5, 2008, entitled CARCASS INTERVENTION TRACKING AND METHODS, which claims the benefit of U.S. Provisional Application Ser. No. 60/985,374 filed on Nov. 5, 2007, entitled CARCASS INTERVENTION TRACKING, the entire disclosures of which are incorporated herein by reference.

TECHNICAL FIELD

The present invention generally relates to carcass tracking. More particularly, the present invention relates to systems and methods for tracking information relating to carcass interventions for a particular carcass during processing.

BACKGROUND

During commercial meat production, a beef carcass is subjected to a number of different processing steps prior to and during the preparation of meat cuts and other meat products from the carcass. The objective of several of these steps, referred to herein as "interventions," is microbial reduction. For example, shortly after an animal is slaughtered, it is subjected to a hide-on carcass wash to reduce potential microbial contamination on the carcass hide. The hide is then removed, often followed by another washing step. Portions of the carcass may also be steam pasteurized prior to being chilled. During many of these interventions, it is desirable to operate within predetermined processing parameters to maximize the effectiveness of the intervention.

The carcasses are also tested and/or inspected at a number of locations along the meat processing line, and certain information regarding carcasses may be recorded at the testing/inspection locations. An example of this is a test to determine whether the carcass surface exhibits indicators of fecal contamination. In addition, portions of the carcass that have been removed, such as the viscera, may be inspected to ensure that the animal was healthy at the time of slaughter. Additional inspections may occur on meat cuts and other meat products derived from the carcasses.

Unfortunately, measurements on processed carcasses, carcass portions and/or meat products will, from time to time, not pass one or more inspections that occur inside or outside the processing facility. Occasionally, measurement that do not pass an inspection(s) are caused by a carcass characteristic or condition that was caused, or intended to be addressed, by a particular intervention.

To determine the source or cause and/or to remedy such undesired measurements, it is often helpful to consider whether an intervention performed on that carcass was operating outside of a predetermined parameter(s). With respect to the hide-on carcass wash, for example, it may be helpful to determine whether the wash system was operating outside of a temperature parameter at the time the carcass having the undesired measurements was washed. Conventional processing operations manually record data relating to interventions performance as a function of date and time. However, because this approach does not allow data to be continuously collected for each carcass, such recorded data is of limited usefulness for tracking the source of such undesired measurements. Additionally, this approach does not identify the specific time frame during which an intervention was not operating within desired parameters.

SUMMARY

In an aspect of the present invention, a system for processing carcasses is provided. The system comprises at least one carcass intervention wherein carcasses are subjected to a processing step(s); a carcass identification system for assigning identifiers to individual carcasses during processing; an intervention interface system configured to record data from the intervention; and a control system configured to receive data from the intervention interface(s) and to associate data relating to a carcass with the assigned identifier of the carcass.

In another aspect of the present invention, a method of processing a carcass is provided. The method includes assigning an identification to the carcass; subjecting the carcass to at least one intervention wherein processing data relating to the carcass is accumulated; associating the processing data with the carcass identification; and comparing the associated processing data with at least one predetermined intervention processing parameter.

In another aspect of the present invention, a method of processing a carcass is provided. The method comprises assigning an identification to the carcass by attaching an electronic identification tag to at least one of the carcass and a trolley that carries the carcass; scanning the electronic identification tag and storing the carcass identifier in a database; subjecting the carcass to an intervention and inspection wherein intervention processing data and inspection processing data relating to the carcass is accumulated; associating accumulated intervention processing data and inspection processing data with the carcass identifier in the database; comparing the accumulated intervention processing data and inspection processing data to one or more predetermined processing parameters; and determining whether an inspection having a processing parameter outside of a predetermined range is related to an intervention operating outside of a predetermined range.

BRIEF DESCRIPTION OF THE DRAWINGS

The accompanying drawings, which are incorporated in and constitute a part of this application, illustrate several aspects of the present invention and together with description of the embodiments serve to explain the principles of the invention. A brief description of the drawings is as follows.

DETAILED DESCRIPTION

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Figure 1:
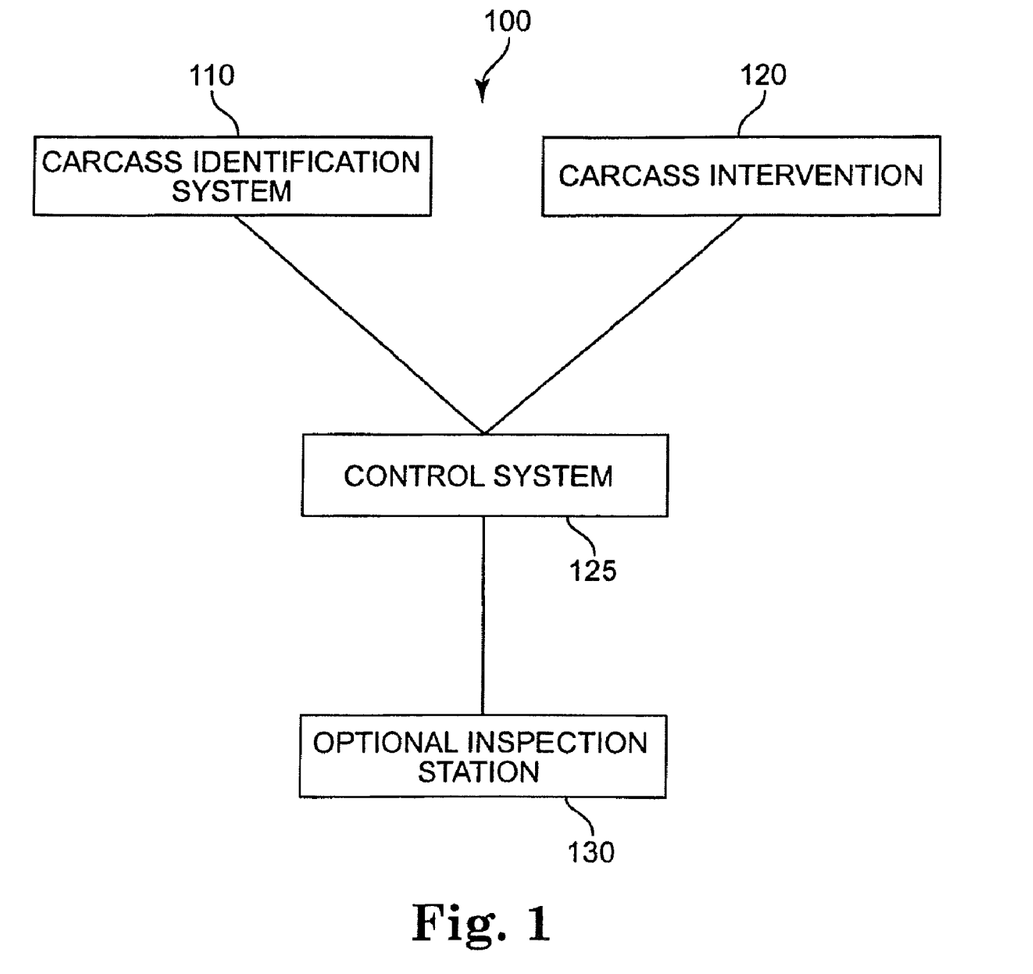
FIG. 1 illustrates an exemplary system for processing carcasses according to an embodiment of the present invention.

FIG. 1 is a schematic illustration of a system 100 for processing carcasses according to an embodiment of the present invention. The system 100 includes a carcass identification system 110, at least one carcass intervention 120, a control system 125 adapted to communicate with the identification system 110 and intervention 120, and an optional inspection station 130.

Carcass Identification System

A variety of carcass identification systems 110 may be used according to embodiments of the present invention, including systems conventionally employed to track information relating to characteristics (e.g., carcass weight, type or origin) of a carcass. Examples of such tracking systems include vision based systems such as the TolleyVision® tracking system manufactured by Automated Systems Technologies Design. Other suitable carcass identification systems that can be used as carcass identification system 110 include a machine readable tag(s) or label(s) attached to the carcass and one or more tag readers. Examples of such tags or labels include visual 2D coding, bar-codes and RF1D tags. In other exemplary systems, sequential identifiers could be used to track the carcasses on a first-in, first-out basis.

In an exemplary embodiment, carcass identification system 110 comprises an RF1D system such as the system described in U.S. Pat. No. 6,724,309, the entire disclosure of which is hereby incorporated herein by reference for all purposes. Such system utilizes a RF1D tag that attaches to the carcass and/or conveyor trolley. The system further includes one or more of readers to identify and track each carcass during processing. In one exemplary embodiment, the RF1D tag is preferably adapted to receive and record processing information from the control system 125.

In another exemplary embodiment, the identification system 110 is adapted to track carcass portions (e.g., primal, sub-primal and trim portions), meat cuts and/or other meat products (e.g., ground beef) derived from the source carcass. This can be accomplished, for example, using additional identification tags or labels that associate each portion, cut or other product with the source carcass or carcasses.

Interventions

A variety of carcass interventions 120 that accumulate processing data may be incorporated into the system 100. Exemplary interventions 120 include various hide and/or carcass cleaning, disinfecting, mechanical evaluation and/or pasteurization interventions. Examples of processing data that may be obtained from or accumulated by each intervention 120 includes processing time, temperature, microbial reduction, component/solution concentration, pH, pressure, conductivity and/or flow. Carcass characteristics (e.g., carcass identification, trolley number, weight, gender, age, lot, kill date, carcass side, dwell time, rail out time, rail in time) may also be recorded and submitted to the control system 125.

Figure 2:
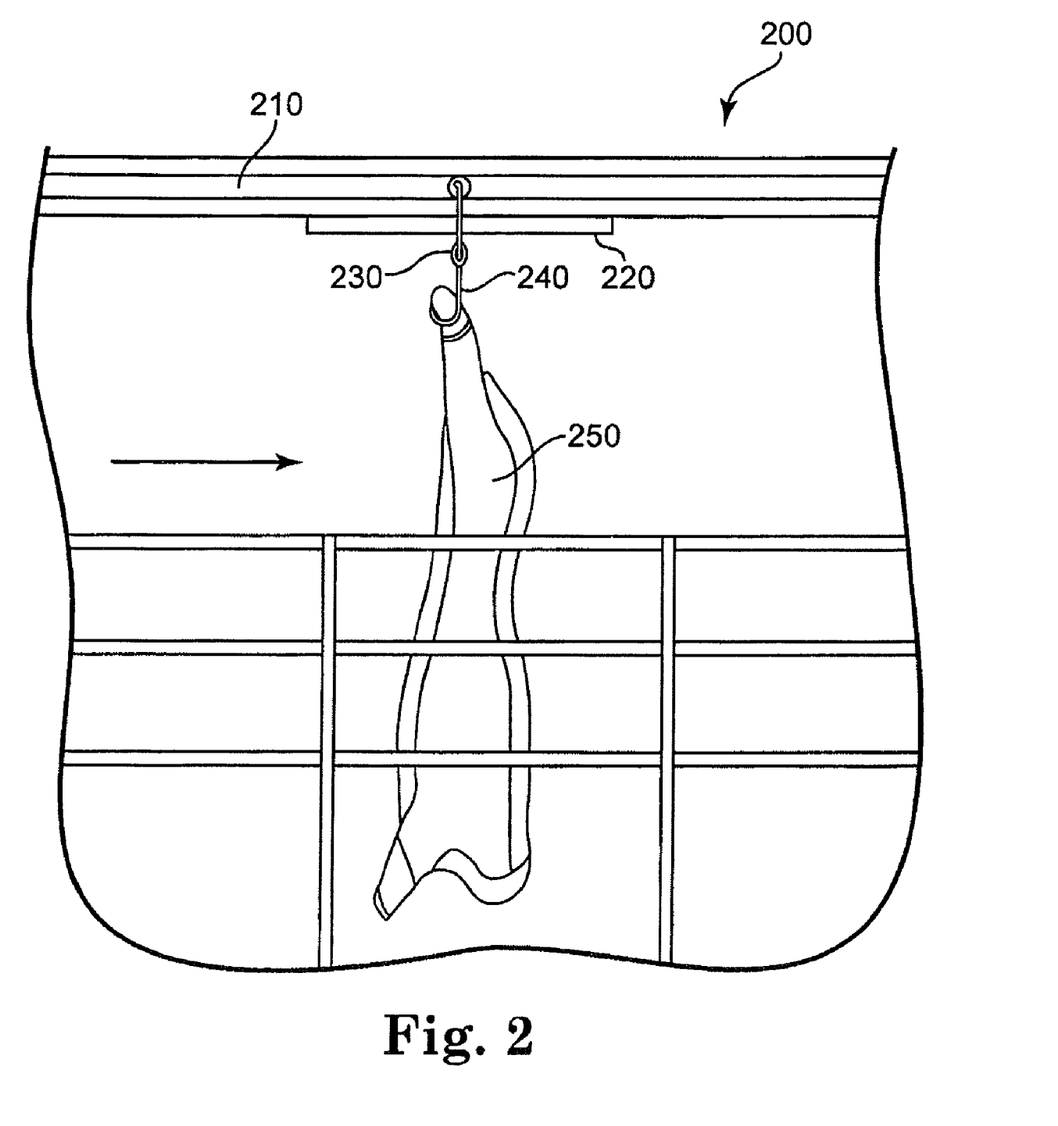
FIG. 2 illustrates an exemplary conveyor system according to an embodiment of the present invention.

System 100 may also include conveyors to convey the carcass to and between various interventions 120. FIG. 2 illustrates an exemplary overhead carcass conveyor 200 according to an exemplary embodiment of the present invention which includes an overhead track 210, a chain 220 movably attached to the overhead track 210 and a trolley 230 including a hook 240 for carrying a carcass 250.

Figure 3:
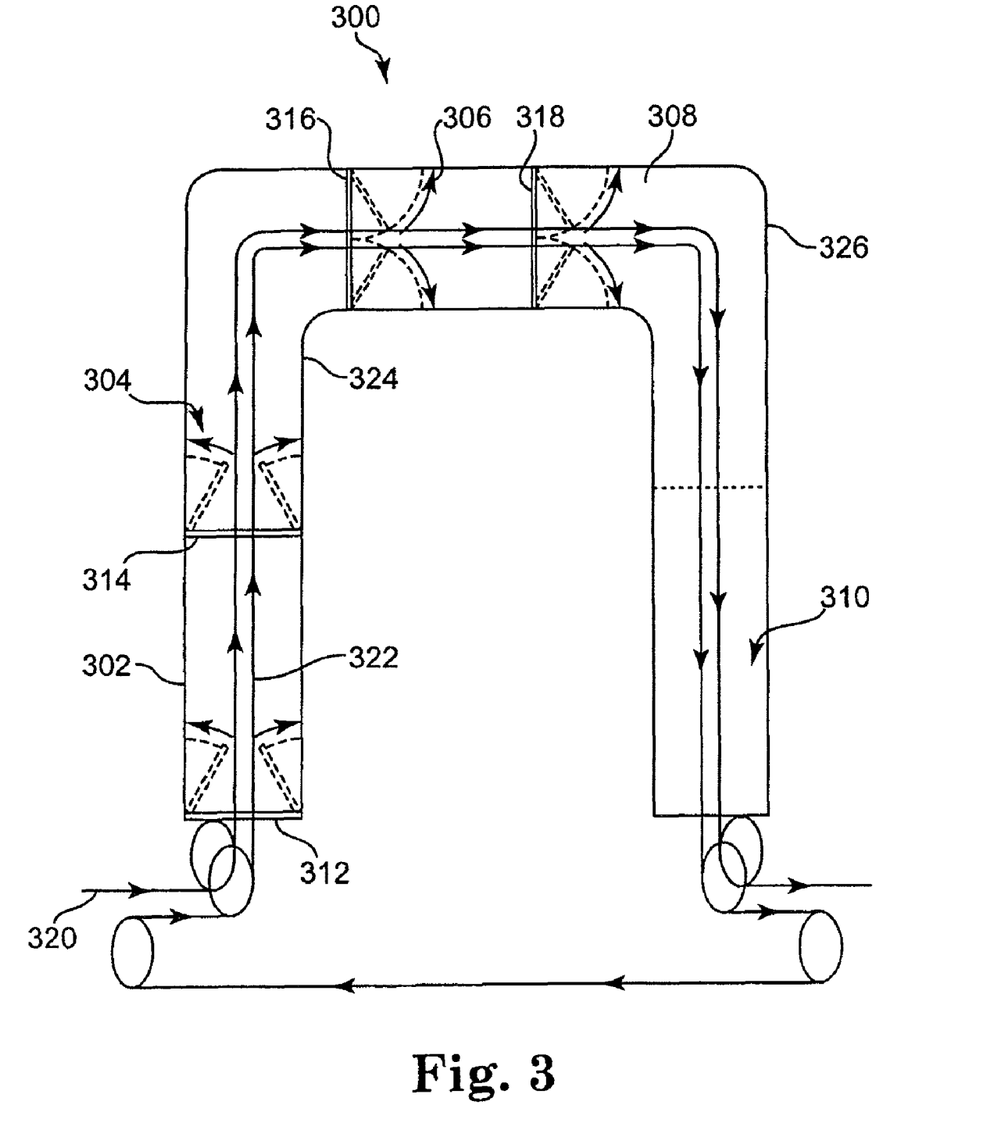
FIG. 3 illustrates an exemplary carcass wash system according to an embodiment of the present invention.

In an exemplary embodiment, a hide-on carcass wash intervention 120 is incorporated into system 100 in accordance with the present invention. FIG. 3 is a schematic illustration of an exemplary carcass wash system 300. Exemplary carcass wash systems that can be used in accordance with the present invention are described in U.S. patent application Ser. No. 11/084,785, filed on Mar. 18, 2005 and, which is hereby incorporated by reference herein fully for all purposes. Wash system 300 preferably includes several discrete areas, zones and/or chambers, including a first buffer area 302, a first wash area 304, a second buffer area 306, a second wash area 308, and a drying area 310. The wash system 300 also preferably includes two approximately 90 degree turns in the first and second wash areas 304, 308 configured so the wash system 300 defines a generally U-shaped configuration. In another embodiment, the wash system 300 shown in FIG. 3 could be configured in a linear fashion by eliminating the 90-degree turns. In a further embodiment, a third buffer area could be positioned between the second wash areas 308 and the drying area 310.

The use of one or more buffer areas serves several purposes depending on the configuration and location of the buffer area within the wash system. Buffer areas located adjacent the entrance to the first wash area 304 and/or the exit to the second wash area 308 serve to limit the escape of airborne material (e.g. wash solution spray contaminants) from the wash system 300 into the external environment. The second buffer area 306 provided between the first and second wash areas 304, 308 serve the additional purpose of increasing the time between the application of the first and second wash solutions onto a particular animal hide.

A plurality of doors may be used to separate the various areas in the wash system 300. A first door 312 provides an entrance door into the first buffer area 302. A second door 314 is preferably provided between the first buffer area 302 and the first wash area 304. A third door 316 is preferably provided between the first wash area 304 and the second buffer area 306. A fourth door 318 is preferably provided between the second buffer area 306 and the second wash area 308. Although not shown, additional doors and/or blowers could be included between the second wash area 308 and the drying zone 310 and/or between the drying zone 310 and the end of the wash area 300. Likewise, any of the reported doors, particularly the third door 316 and fourth door 318, may be eliminated. In this embodiment, the second buffer area 306 may serve primarily to increase the hide dwell time of the wash solution applied in the first wash area 304 prior entry into the second wash area 308.

A first rail 320 and a second rail 322 extend through the wash system 300. The first and second rails 320, 322 may be associated with a plurality of leg shackles (not shown) wherein a first hind leg of a carcass is shackled to the first rail, and a second hind leg of the carcass is shackled to the second rail. In an exemplary embodiment, the first and second hind legs are shackled to align the belly of the carcass to an inside wall 324 and the back of the animal to an outside wall 326 of the wash room. In an alternate embodiment, other devices may be used to transport the animal, including chains, tracks, conveyors and other conventional inventory transporting systems.

The second rail 322 preferably forms a continuous loop with respect to the wash system 300. The second rail 322 may employ captive leg shackles that remain attached to the second rail 322. As a carcass approaches or enters the wash system 300 along the first rail 320, the second hind leg of the carcass is attached to the captive shackle on the second rail 322 to align the carcass prior to entry into the first buffer chamber 302.

A variety of different types of processing data may be accumulated with respect to such carcass wash interventions 120, including temperature, time, flow, pressure (liquid, steam, air), conductivity, dwell time, as well as chemical composition, concentration and pH.

Control System

Control system 125 is preferably configured to obtain carcass identifiers from the identification system 110 and processing data from the intervention 120, and to associate each carcass identifier with corresponding processing data. In one exemplary embodiment, control system 125 includes a microprocessor. The microprocessor can be any microprocessor capable of communicating with the carcass identification system 110 and carcass interventions 120 to associate processing data with carcass identifiers. In one example, the control system 125 includes a programmable logic controller (PLC) functionally capable of performing the tasks described in detail below.

The control system 125 also preferably includes peripheral components or other interfaces, which facilitate communication with the identification system 110 and carcass interventions 120. In one embodiment, the control system includes an identification interface adapted to communicate identification information relating to processed carcasses to the microprocessor. In one example, the interface comprises an electronic tag reader that is positioned to identify carcasses at an intervention. In another example, the interface comprises a terminal or peripheral into which a carcass identifier is manually entered. In a first-in, first-out identification system 110, the interface may comprise an electronic counting mechanism or the like.

In another embodiment, the control system 125 preferably includes an intervention interface 150 configured to receive processing data from the intervention 120 and to communicate the data to the microprocessor. In one example, the intervention interface comprises a direct link between the intervention 120 and the microprocessor. For a carcass wash intervention, for example, the wash system may automatically record processing data and send that data to the microprocessor. In another embodiment, the intervention interface comprises a peripheral component such as a temperature sensor or pH sensor. In another embodiment, the interface is also capable of communicating with the intervention to, for example, modify the processing operation based on instructions from the microprocessor.

In an exemplary embodiment, the microprocessor is configured to associate processing data with the identifier in, for example, an electronic database. This identifier could also be associated with other information relating to the carcass. In another embodiment, the microprocessor is further adapted to compare the processing data with one or more predetermined parameters and to determine whether the processing data falls within the predetermined parameters. For example, if the first processing data relates to a processing temperature, the microprocessor is adapted to determine whether the processing temperature falls within certain predetermined temperature parameters and associates that determination with the carcass identifier. In yet another embodiment, the microprocessor is adapted to prepare a report summarizing processing data relating to a carcass and/or intervention at the direction of a user.

In a further exemplary embodiment, the control system 125 is preferably configured to take one or more actions based on the comparison of the processing data and predetermined processing parameters. In one such example, the microprocessor flags carcass identifiers that are associated with processing data falling outside one or more predetermined parameters. In another example, the microprocessor alerts the intervention or plant personnel if a carcass identifier is associated with processing data falling outside of one or more predetermined processing parameters. In yet another example, the control system 125 is adapted to make one or more processing decisions based on the comparison of the processing data and predetermined processing parameters. For example, if a carcass identifier is associated with processing data that falls outside of predetermined processing parameter, the control system 125 is preferably configured to deliver instructions or operate the processing system to process the carcass associated with that identifier differently than other carcasses, such as with additional inspection or intervention steps, for example.

In an additional exemplary embodiment, system 110 also incorporates one or more inspection stations 130 adapted to communicate inspection information (e.g., passed inspection or failed inspection, for example) to the microprocessor via one or more peripheral or interface components so the microprocessor 130 can associate the inspection information with the corresponding carcass identifier. Computer terminals and pass/fail vision technology are examples of suitable components of the inspection interface.

In an exemplary embodiment, the interface is preferably configured to communicate processing data about a carcass from the microprocessor 130 to the inspection interface so that an inspector can consider relevant processing data during inspection. In another embodiment, the control system 125 is preferably configured to modify processing steps in the event of a failed inspection at the inspection station 120 and/or if a carcass is associated with processing data that falls outside of the predetermined processing parameters.

Figure 4:
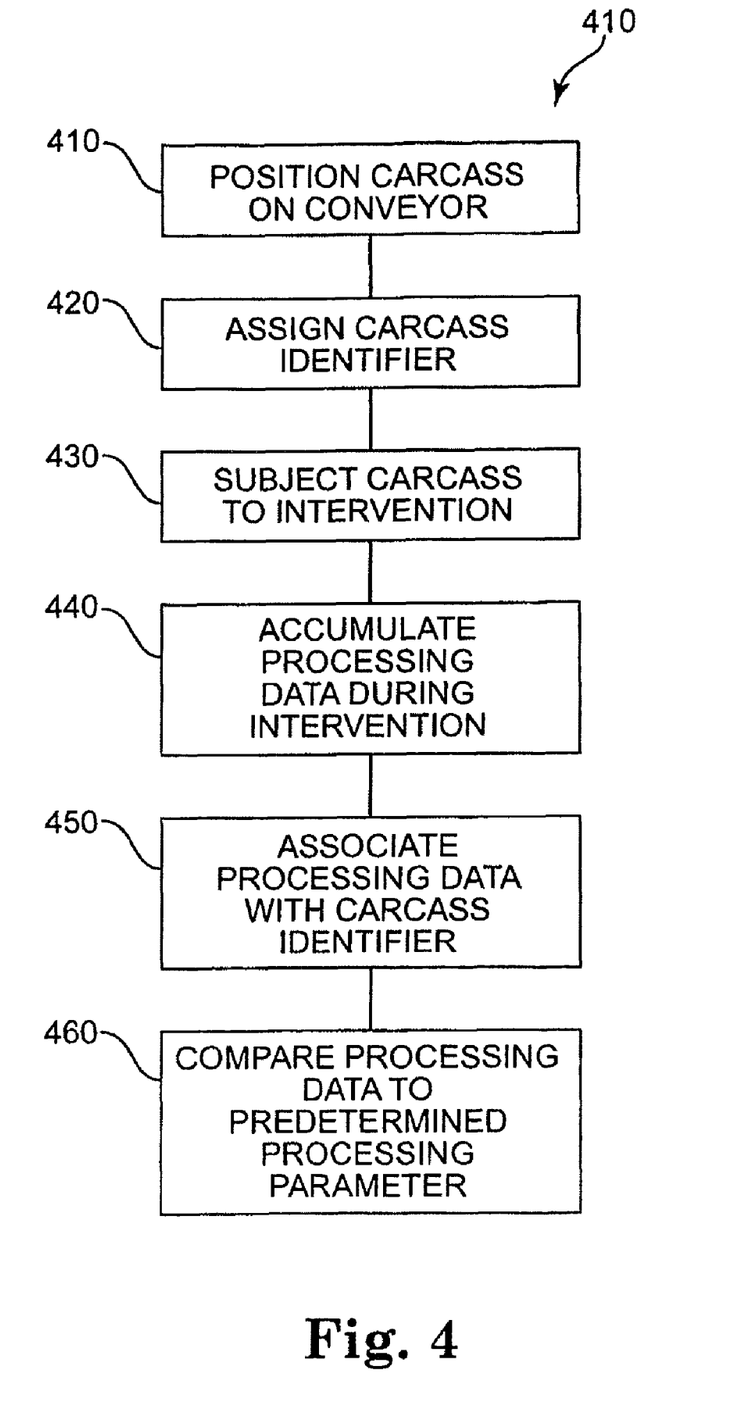
FIG. 4 illustrates an exemplary method for processing carcasses according to an embodiment of the present invention.

FIG. 4 illustrates a method 400 for processing carcasses according to an exemplary embodiment of the present invention. A carcass is first positioned on a conveyor that carries the carcass through one or more interventions and/or inspections 410. Prior to or after being positioned on the conveyor, the carcass and/or the trolley by which the carcass is carried is assigned an identifier 420. The carcass is then subjected to at least one intervention 430, at which processing data relating to the intervention is accumulated 440. The processing data relating to the carcass is then associated with the carcass identifier 450 and compared to at least one predetermined processing parameter 460. In an exemplary embodiment, processing data related to a single carcass for any number of interventions can be compared. For example, all processing data for all interventions for a single carcass can be compared. The carcass may also be inspected and information from the inspection may be associated with the carcass identifier.

Figure 5:
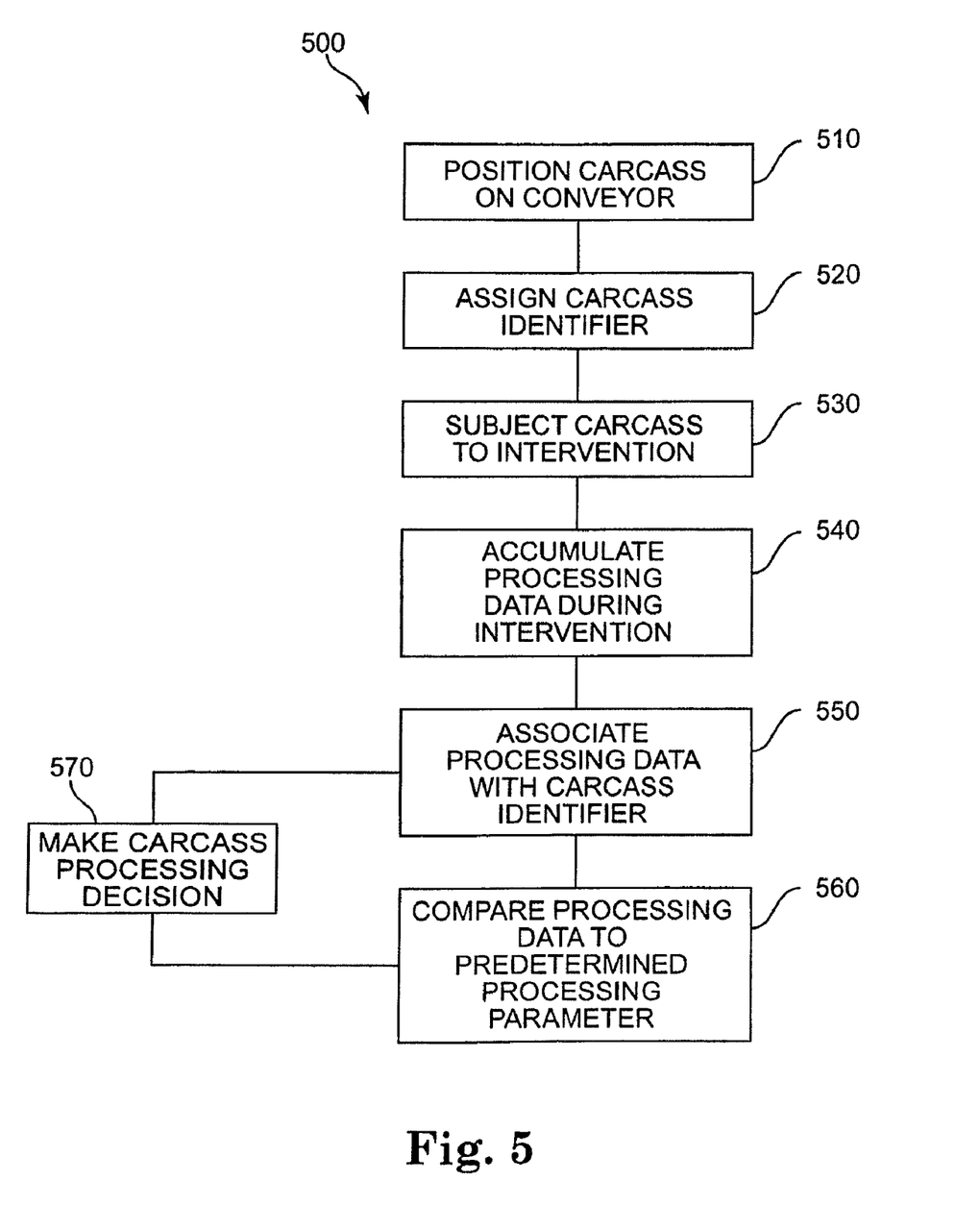
FIG. 5 illustrates an exemplary method for processing carcasses according to an embodiment of the present invention.

Exemplary method 500 illustrated in FIG. 5 is similar to method 400 except that at least one processing decision 570 is made based on the comparison of the processing information and predetermined processing parameters. A carcass is first positioned on a conveyor that carries the carcass through one or more interventions and/or inspections 510. Prior to or after being positioned on the conveyor, the carcass and/or the trolley on which the carcass is carried is assigned an identifier 520. The carcass is then subjected to at least one intervention 530, at which processing data relating to the intervention is accumulated 540. The processing data relating to the carcass is then associated with the carcass identifier 550 and compared to at least one predetermined processing parameter 560. In an exemplary embodiment, processing data related to a single carcass for any number of interventions can be compared. For example, all processing data for all interventions for a single carcass can be compared. The carcass may also be inspected and information from the inspection may be associated with the carcass identifier. For example, if the processing data falls within the predetermined processing parameters, a default set of processing steps (e.g., interventions and inspections) are carried out on the carcass. However, if the processing data falls outside of the scope of the parameter, a different set of processing steps are carried out. Alternatively or additionally, at least one processing decision is made only if the processing data for the carcass falls outside of the predetermined processing parameter and at least one inspection is failed.

Figure 6:
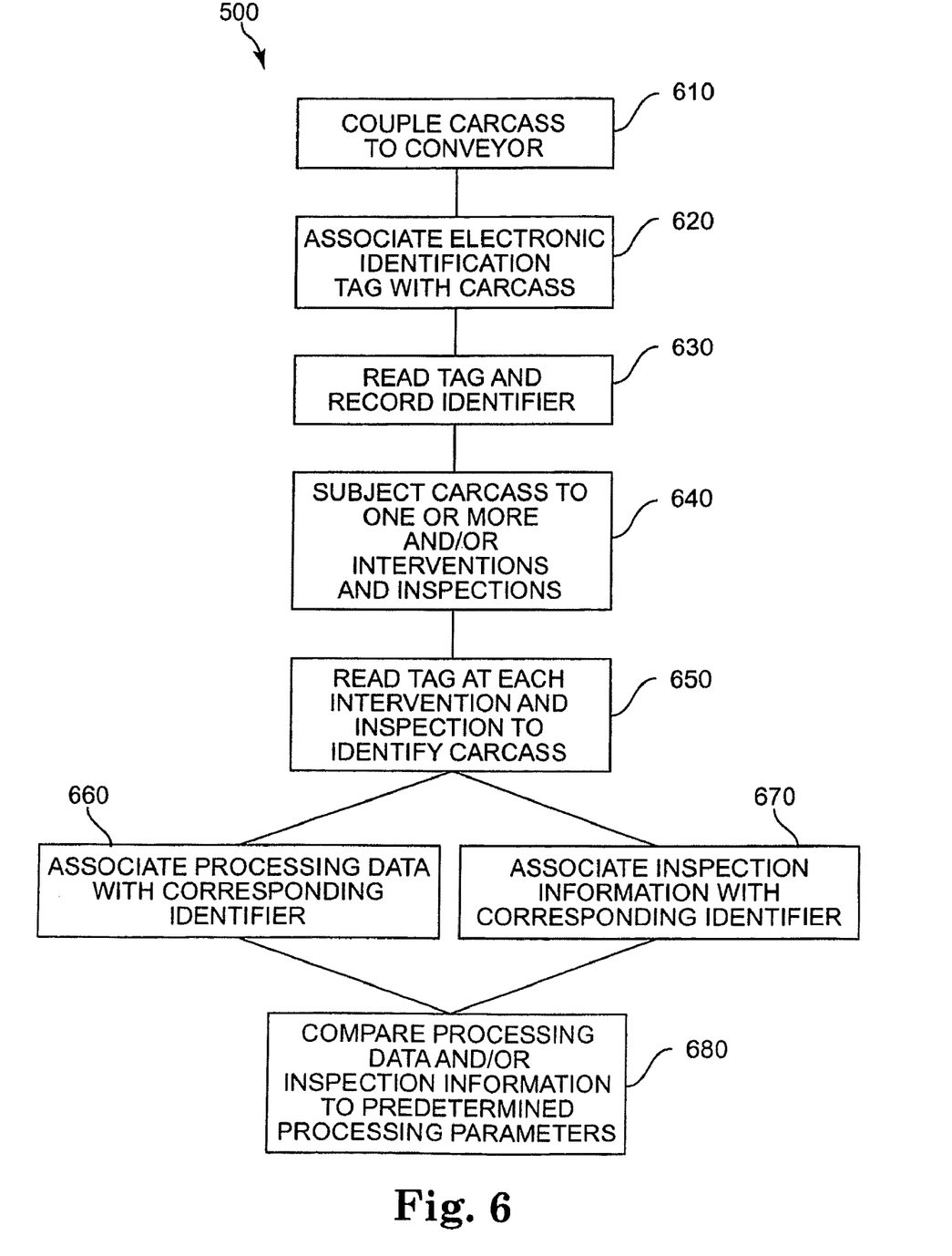
FIG. 6 illustrates an exemplary method for processing carcasses according to an embodiment of the present invention.

FIG. 6 illustrates another exemplary method 600 for processing a carcass according to an embodiment of the present invention. The carcass is hung from an overhead conveyor (610) and an electronic identification tag is attached to the carcass and/or carcass trolley (620). The tag is initially scanned by a reader and the carcass identifier is stored in a database (630). The carcass is then subjected to one or more interventions and/or inspections (640) at which the electronic tag is again scanned. Processing data accumulated at each intervention (660) and inspection information accumulated at each inspection (670) is then associated with the identifier of that carcass in the database. The processing data and inspection information for a carcass is then compared to at least one predetermined parameter (680) to determine whether a failed inspection is related to an intervention operating outside of predetermined parameters.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A system for processing carcasses, comprising:
    at least one carcass intervention wherein carcasses are subjected to a processing step;
    a carcass identification system for assigning identifiers to an individual carcass portion during processing;
    an intervention interface configured to record data from the intervention; and
    a control system configured to receive data from the intervention interface and to associate data relating to a carcass with the assigned identifier of the carcass portion.

2. The system of claim 1, wherein the carcass intervention comprises one or more of carcass washing, antimicrobial application, hot water pasteurization, organic matter detection, and steam pasteurization treatment.

3. The system of claim 1, wherein the data includes at least one of time data, temperature data, pH data, pressure data, and composition data.

4. The system of claim 1, wherein the control system includes a microprocessor.

5. The system of claim 4, wherein the identification system includes electronic tags associated with one or more of each carcass from which the carcass is derived and each trolley that carries the carcass and at least one reader associated with the microprocessor.

6. The system of claim 5, wherein at least one reader is positioned to read the electronic tags just prior to or during the intervention.

7. The system of claim 4, wherein the microprocessor is configured to compare processing data with at least one predetermined intervention processing parameter and to identify carcasses having associated processing data falling outside of the predetermined intervention processing parameter.

8. The system of claim 4, further comprising an inspection interface for receiving inspection information.

9. The system of claim 8, wherein the microprocessor associates inspection information for individual carcass portions with the identifier corresponding to that carcass portion.

10. The system of claim 8, wherein the inspection interface comprises a direct link between the intervention and the microprocessor.

11. A method of processing a carcass comprising:
    assigning an identification to a carcass portion;
    subjecting a carcass from which the carcass portion is derived or to at least one intervention wherein processing data relating to the carcass portion is accumulated;
    associating the processing data with the carcass portion identification; and
    comparing the associated processing data with at least one predetermined intervention processing parameter.

12. The method of claim 11, wherein assigning an identification to the carcass for which the carcass portion was derived or the carcass portion comprises attaching an electronic identification tag to at least one of the carcass and a trolley that carries the carcass.

13. The method of claim 12, comprising reading the electronic identification tag just prior to or during the intervention.

14. The method of claim 11, wherein the carcass intervention comprises one or more of carcass washing, antimicrobial application, hot water pasteurization, organic matter detection, and steam pasteurization treatment.

15. The method of claim 11, wherein comparing the associated processing data with at least one predetermined intervention processing parameter comprises identifying carcass portions having associated processing data different from the predetermined intervention processing parameter.

16. The method of claim 1 comprising making a processing decision based on the comparison of the processing data and the at least one predetermined intervention processing parameter.

17. The method of claim 11, wherein comparing the associated processing data with at least one predetermined intervention processing parameter comprises comparing all processing data for a single carcass.

18. A method of processing a carcass comprising:
    assigning an identification to a carcass portion by attaching an electronic identification tag to at least one of the carcass from which the carcass portion is derived and a trolley that carries the carcass from which the carcass portion is derived;
    scanning the electronic identification tag and storing the carcass portion identifier in a database;
    subjecting the carcass from which the carcass portion is derived to an intervention and inspection wherein intervention processing data and inspection processing data relating to the carcass is accumulated;
    associating accumulated intervention processing data and inspection processing data with the carcass portion identifier in the database;
    comparing the accumulated intervention processing data and inspection processing data to one or more predetermined processing parameters; and
    determining whether an inspection having a processing parameter outside of a predetermined range is related to an intervention operating outside of a predetermined range.

19. The method of claim 18, comprising scanning the electronic identification tag just prior to or during one or more of the intervention and inspection.

20. The method of claim 18, wherein the carcass intervention comprises one or more of carcass washing, antimicrobial application, hot water pasteurization, organic matter detection, and steam pasteurization treatment.

* * * * *

UNITED STATES PATENT AND TRADEMARK OFFICE
CERTIFICATE OF CORRECTION

| | | |
|---|---|---|
| PATENT NO. | : 8,079,897 B2 | Page 1 of 1 |
| APPLICATION NO. | : 12/849462 | |
| DATED | : December 20, 2011 | |
| INVENTOR(S) | : Garry P. Knopik et al. | |

It is certified that error appears in the above-identified patent and that said Letters Patent is hereby corrected as shown below:

In column 8, line 38, in claim 16, delete "claim 1" and insert -- claim 11, --, therefor.

Signed and Sealed this
Twenty-seventh Day of March, 2012

David J. Kappos
*Director of the United States Patent and Trademark Office*